United States Patent [19]
Yabuta

[11] 3,825,303
[45] July 23, 1974

[54] FLUID PRESSURE REGULATING DEVICE FOR AUTOMOTIVE BRAKING SYSTEMS

[75] Inventor: Keiichiro Yabuta, Yokohama, Japan

[73] Assignee: Nissan Motor Company Limited, Yokohame City, Japan

[22] Filed: Sept. 22, 1972

[21] Appl. No.: 291,384

[30] Foreign Application Priority Data
Sept. 23, 1971  Japan............... 46-74278
Sept. 23, 1971  Japan............... 46-74279
Nov. 12, 1971   Japan............... 46-90455

[52] U.S. Cl. ............... 303/6 C, 303/24 C
[51] Int. Cl. ............................. B60t 13/06
[58] Field of Search..... 303/24 AH, 6 C, 6 R, 84 A, 303/84 R; 188/349, 275

[56] References Cited
UNITED STATES PATENTS
3,252,740  5/1966  Stelzer................... 303/24 F Primary Examiner—Duane A. Reger
Assistant Examiner—D. C. Butler

[57] ABSTRACT

An improved fluid pressure regulating device which is incorporated in a motor vehicle braking system having a master cylinder and a wheel cylinder or cylinders. The pressure regulating device includes a pressure proportioning or limiting valve section using a combination of a fluid operated plunger and a fluid operated and spring loaded piston, an inertia-responsive valve section including a valve member usually in the form of a ball which is responsive to a predetermined rate of deceleration so as to vary the fluid pressure acting on the piston, and control means for controlling the axial movement and accordingly the output pressure from the pressure proportioning or limiting valve section to the wheel cylinder or cylinders. Various preferred constructions of the control means are disclosed.

13 Claims, 17 Drawing Figures

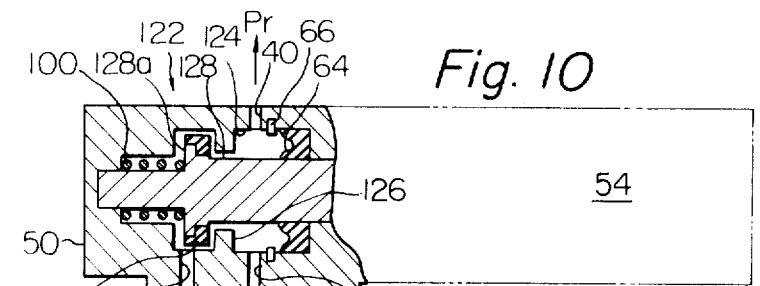
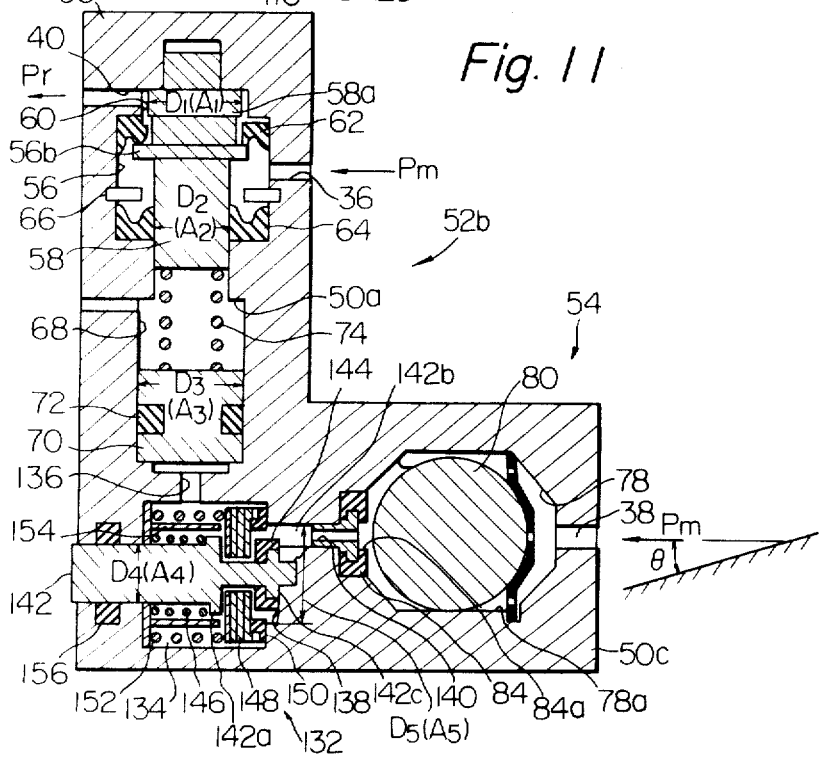

3,825,303

FLUID PRESSURE REGULATING DEVICE FOR AUTOMOTIVE BRAKING SYSTEMS

The present invention relates generally to hydraulic braking systems of motor vehicles and, more particularly, to fluid pressure regulating devices to be incorporated in such braking systems.

Usual motor vehicle braking systems are such that the brakes are applied on the front and rear wheels concurrently. If, under this condition, an excess amount of braking force is applied to the front wheels, the driver loses directional control over the motor vehicle and sometimes invites a serious danger on the vehicle occupants. If, conversely, the rear wheels are braked excessively, then there is a danger of the rear wheels locking and skidding. The prior art braking systems are thus not fully acceptable for the assurance of safety of the motor vehicle during the braking operation and for providing satisfactory braking efficiency.

The present invention contemplates provision of an improved fluid pressure regulating device eliminating these and other drawbacks of the prior art counterparts.

The fluid pressure regulating device according to the present invention is adapted to vary the fluid pressure for the wheel cylinders of the motor vehicle in such a manner that the braking force on the wheels and the ratio of the braking force versus an overall weight of the motor vehicle are varied in accordance with variation in the vehicle weight.

The fluid pressure regulating of this nature is generally made up of a housing having formed therein first, second and third cavities of which the first and second cavities are axially aligned with each other, first and second fluid inlet ports leading from a master cylinder and opened respectively into the first and third cavities and a fluid outlet port leading from the first cavity to a wheel cylinder or cylinders. A plunger is axially movable through the first cavity and extends toward the second cavity. This plunger has an annular projection having differential working areas on both sides thereof and is operable to selectively establish and interrupt communication between the first fluid inlet port and the fluid outlet port as the plunger is axially moved. A piston is axially slidable in the second cavity, which piston is axially aligned with the plunger in the first cavity. The second cavity has accommodated therewithin a preload spring which is seated on opposed end faces of the aligned plunger and piston for thereby biasing the plunger away from the piston, viz., to a position in which the communication between the first fluid inlet port and the fluid outlet port is established through the first cavity. The second cavity is in communication with the third cavity through a passage commencing at the end of the second cavity remote from the first cavity. An inertia-responsive valve member which may be in a ball form is positioned on an incline forming part of the wall defining the third cavity. A valve seat member is mounted in the third cavity and positioned relative to the valve member. The valve seat member has an aperture providing the communication between the second and third cavities. The inertia-responsive valve member is responsive to a predetermined rate of deceleration and, when subjected to such deceleration, moved up the incline and contact the valve seat member for closing the aperture therein. Control means is provided for biasing the plunger toward a position establishing the communication between the first fluid inlet port and the fluid outlet port.

The objects, advantages and nature of the fluid pressure regulating device will become more apparent from the following description taken in conjunction with the accompanying drawings in which corresponding parts and elements are designated by like reference numerals and characters throughout the figured and in which:

FIG. 10 is a fragmentary longitudinal sectional view showing a modification of the regulating device shown in FIG. 9;

FIG. 11 is also a longitudinal sectional view showing still another preferred embodiment of the regulating device according to the present invention;

Figure 1:
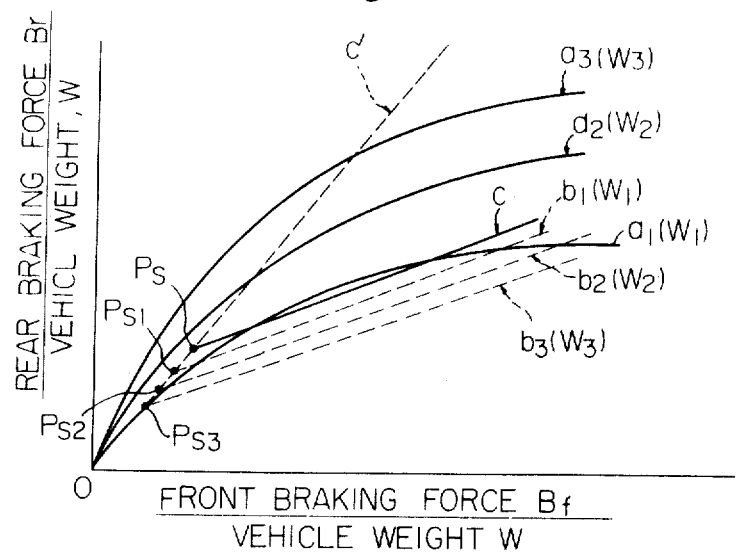
FIG. 1 is a graphic representation of conventional and desired proportions between the front and rear braking forces $B_f$ and $B_r$, respectively, in terms of various overall weights W of the motor vehicle.

Referring to the drawings, FIG. 1 shows proportions between the braking forces to be applied to the front and rear wheels of motor vehicles having different weights, wherein ratios of the braking forces $B_f$ and $B_r$ on the front and rear wheels versus the weight W of the motor vehicle are indicated on the axes of abscissa and ordinate, respectively, of orthogonal coordinates. Curves $a_1$, $a_2$ and $a_3$ demonstrate desired relationships between the ratios $B_f/W$ and $B_r/W$ in motor vehicles having different weights $W_1$, $W_2$ and $W_3$, respectively, where $W_1 < W_2 < W_3$.

As is apparent from the illustration of FIG. 1, it is desired that the fluid pressure to be directed to the wheel cylinders of the rear wheels be increased in such a manner that the rate of increase of the fluid pressure follows the curve $a_1$, $a_2$ or $a_3$ depending upon the weight of the motor vehicle as the fluid pressure from the master cylinder increases, in a braking system in which the fluid pressure supplied from the master cylinder is directed to the wheel cylinders of the front wheels without positive modification. A variety of pressure regulating devices have thus far been proposed so as to achieve this purpose. Typical of such devices are the pressure limiting valves by which the pressure of the outgoing fluid to the rear wheel cylinders is prevented from increasing once the pressure of the incoming fluid reaches a predetermined critical level which is herein denoted by $P_s$. Other representative examples of the regulating devices are the pressure proportioning valves by which the fluid pressure for the rear wheel cylinders if varied so that the rate of increase of the pressure decreases substantially linearly as indicated by the plots $b_1$, $b_2$ and $b_3$ depending upon the weights $W_1$, $W_2$ and $W_3$, respectively, of the motor vehicles after the predetermined cirtical level $P_s$ is reached by the fluid pressure supplied from the master cylinder. In the valves of either of such characters, the critical level $P_s$ is a fixed value and, as a result, the points $P_{s1}$, $P_{s2}$ and $P_{s3}$ at which the rate of increase of the fluid pressure slows down come into play earlier during the braking operation as the weight of the motor vehicle increases as a consequence of an increase in the loadage such as the vehicle occupants and baggages on the motor vehicle as seen in FIG. 1. The points $P_{s1}$, $P_{s2}$ and $P_{s3}$ on the plots $b_1$, $b_2$ and $b_3$, respectively, thus deviate from the desired curved $a_1$, $a_2$ and $a_3$ so that considerable reduction in the braking efficiency results. Inertia-operated pressure regulator valves have therefore been proposed to overcome this problem, such valves being adapted to be responsive to deceleration of the motor vehicle and to vary the above mentioned critical level $P_s$ of the fluid pressure proportionally to the weight of the loaded motor vehicle. Curve $c$ in FIG. 1 is a characteristics curve which is obtained by the use of the inertia-operated pressure regulator valves of this particular nature, whereby the point $P_{sc}$ at which the rate of increase commences to diminish is varied linearly in accordance with a fixed schedule as indicated by a broken line $c'$ in FIG. 1. The fluid pressures for braking the front and rear wheels of the motor vehicle thus fail to follow the desired curves $a_1$, $a_2$ and $a_3$ as the overall weight of the loaded motor vehicle varies from $W_1$ to $W_2$ and from $W_2$ to $W_3$, respectively. The inertia-operated pressure regulator valves are, for this reason, still not fully acceptable for the reliable and efficient control of the fluid pressures on the brake cylinders. The above described problems are solved in the known load sensitive valves which are constructed and arranged so that the critical level $P_s$ of the fluid pressure and the ratio of the level $P_s$ to the amount of load on the motor vehicle are increased as the amount of the load augments. The change in the amount of load on the motor vehicle is detected through measurement of the vertical displacement of the vehicle body such as for example the variation in the clearance between the body structure and the wheel axles. Disproportionately complicated and accordingly costly constructions are inevitable in the pressure regulator valves of this nature which, in addition to this problem, are subject to failure due to the use of parts such as springs which are exposed externally.

The pressure regulating device according to the present invention is suitable for eliminating any of the above described drawbacks which have thus been inherent in the prior art pressure regulator valves of the described characters.

Figure 2:
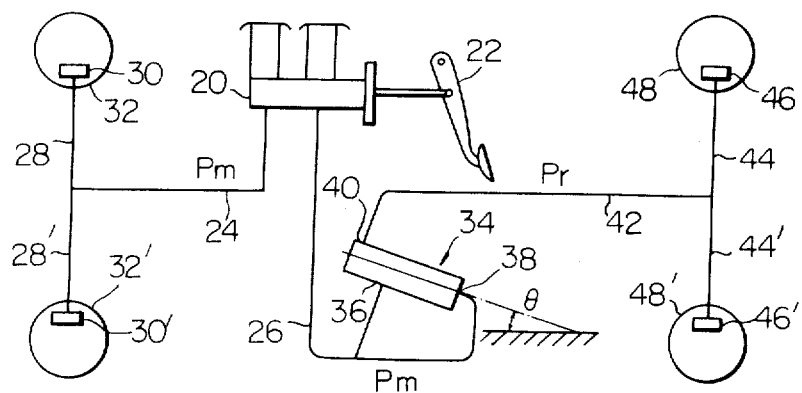
FIG. 2 is a schematic view showing a typical hydraulic braking system to which the pressure regulating device according to the present invention is applied.

The pressure regulating device herein disclosed is compatible with any type of hydraulic braking systems which are known per se. FIG. 2 illustrates an example of the overall constructions of the hydraulic braking systems for use in four-wheeled motor vehicles.

Referring to FIG. 1, the braking system includes a hydraulic master cylinder 20 which is actuated from a foot pedal 22. The master cylinder 20 is herein shown as being of the tandem type by way of example but the device according to the present invention is applicable to braking systems using any other types of master cylinders. Front and rear braking fluid lines 24 and 26 lead from the master cylinder 20. The front braking fluid line 24 is connected through branch lines 28 and 28' to a pair of front wheel cylinders 30 and 30' which are associated with front brakes 32 and 32', respectively. The rear braking fluid line 26, on the other hand, is connected to the fluid pressure regulating device 34 according to the present invention through two inlet ports 36 and 38 formed therein. The pressure regulator device 34 is in its entirety inclined at an angle of $\theta$ from a horizontal plane. The regulating device 34 has an outlet port 40 leading to a fluid line 42 which is connected through branch lines 44 and 44' to a pair of rear wheel cylinders 46 and 46' associated with rear brakes 48 and 48', respectively. The braking system being thus constructed, a fluid pressure $P_m$ is supplied from the master cylinder 20 and directed direct to the front wheel cylinders 30 and 30' through the fluid line 24 for actuating the front brakes 32 and 32', respectively, when the foot pedal 22 is depressed. The fluid pressure $P_m$ from the master cylinder 20 is also directed to the fluid pressure regulating device 34 through the line 26 and the two inlet ports 36 and 38. The pressure regulating device 34 delivers from its outlet port 40 a fluid pressure $P_r$ which is modulated or unmodulated as the case may be. This fluid pressure $P_r$ is directed to the rear wheel cylinders 46 and 46' through the fluid line 42, thereby actuating the rear brakes 48 and 48', respectively, during the braking operation. The detailed construction of the fluid pressure regulating device 34 in a preferred form is now illustrated in FIG. 3.

Figure 3:
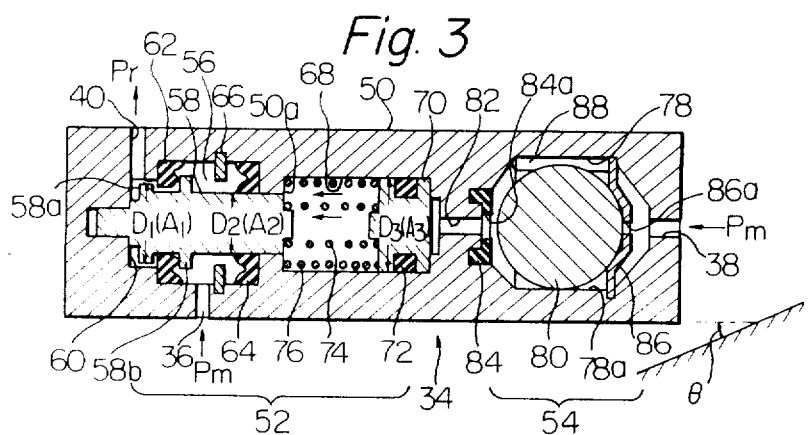
FIG. 3 is a longitudinal sectional view of a preferred form of the pressure regulating device according to the present invention.

Referring to FIG. 3, the fluid pressure regulating device 34 includes a cylindrical housing 50 containing therein a proportioning valve section 52 and an inertia-responsive valve section 54. The housing 50 has formed in its proportioning valve section 52 a generally cylindrical cavity 56 extending in the axial direction of the housing. The cavity 56 is in constant communication with the previously mentioned inlet port 36 leading from the master cylinder 20 (FIG. 2). The above mentioned fluid pressure $P_m$ thus obtains in the cavity 56 when the braking foot pedal is depressed. A plunger 58 is axially movable throughout the cavity 56 and extends into a chamber 60 communicating on one side with the cavity 56 and on the other side with the outlet port 40 leading to the rear wheel cylinders 46 and 46' (FIG. 2). The plunger 58 has a differential flange or annular projection 58a which is located within the chamber 60. The plunger 58 is sized at this annular projection 58a to have an outside diameter $D_1$ and a cross sectional $A_1$ and at its portion extending through the cavity 56 to have an outside diameter $D_2$ and a cross sectional area $A_2$ as indicated in FIG. 3. The annular projection 58a of the plunger 58 is engageable at its inner face with an annular lip seal 62 which is attached to an end wall of the cavity 56. This lip seal 62 sorrounds the plunger 58 at an appreciable spacing therefrom. The plunger 58 is further provided with a flange or annular projection 58b which is engageable with projections of the lip seal 62. This annular projection 58b has end faces with equal areas so that no differential action on the plunger 58 results from the provision of such annular projection. An annular seal 64 is positioned at the end of the cavity 56 opposite to the lip seal 62, closely fitting on the plunger 58. This seal 64 is held position by means of an annular stop member 66 which is fast on the housing 50. The plunger 58 is axially slidably received on the housing 50 at its axial end portions.

In the construction above described, it is important that the inlet and outlet ports 36 and 40 are respectively located anterior and posterior to the spaced annular projections 58b and 58a of the plunger 58 and that these annular projections are spaced apart from each other on both sides of the lip seal 62 slidably resting on the housing 50.

The housing 50 has further formed in its proportioning valve section 52 a cylindrical cavity 68 extending generally in the axial direction of the housing 50 and substantially aligned with the previously mentioned cavity 56. The plunger 58 terminates at an end of the cavity 68 through a stepped annular wall portion 50a on which the plunger is axially slidably received. The cavity 68 is hermetically isolated from the cavity 56 by means of this stepped annular wall portion 50a and the annular seal 64 resting on this wall portion. A piston 70 is axially slidable in the cavity 68 toward and away from the stepped annular wall portion 50a of the housing 50. The piston 70 receives in its annular groove (not numbered) a sealing ring 72 so that the cavity portion across the piston 70 is hermetically sealed off. Two preload springs 74 and 76 are mounted in the cavity 68, biasing the plunger 58 and piston 70 away from each other. One spring 74 is seated on the end faces of the plunger 58 and piston 70, loading the plunger and piston with a force $F_1$. The other spring 76 is positioned around the former spring 74 and is seated on the opposed faces of the piston 70 and the annular wall portion 50 a of the housing 50, thereby biasing the piston 70 away from the wall portion 50a with a force $F_2$.

In the inertia-responsive valve section 54, the housing 50 is formed with a cavity 78 accommodating therewithin an inertia-responsive ball member 80. A passage 82 merges from this cavity 78 and terminates at the end face of the piston 70 opposite to the annular wall portion 50a of the housing 50 as illustrated. The ball member 80 is co-operable with a valve seat member 84 having an aperture 84a through which the cavity 78 is in communication with the passage 82 when the ball 80 is in an unseated condition illustrated. The cavity 78 is bounded by a ball support member 86 supporting on its inner face the ball member 80 which is in the unseated position. This ball support member 86 is secured to the housing 50 and has formed therein a number of orifices 86a. These orifices 86a may be substituted by a single larger orifice where desired. The portion of the cavity 78 behind the ball support member 86 is in constant communication with the previously mentioned inlet port 38 leading from the master cylinder 20 (FIG. 2) so that the fluid pressure $P_m$ is directed to the particular portion of the cavity 78 during the braking condition. The wall portion of the housing 50 defining the cavity 78 is formed with at least one groove 88 axially extending around the ball member 80 for providing uninterrupted fluid communication across the ball member.

The fluid pressure regulating device 34 having the above described construction is adapted for use in the hydraulic braking system of the motor vehicle and, as such, the device in its entirety is positioned to have its axis inclined at an angle of $\theta$ from the horizontal plate with the inertia-responsive valve section 54 directed downwardly and rearwardly of the vehicle body. Thus, when the device as shown is held in such working position, the bottom wall portion defining the cavity 78 of the inertia-responsive valve section 54 forms an incline 78a directed upwardly toward the valve seat 84. The ball member 80 has a predetermined inertia and is arranged to roll in the cavity 78 on this incline 78a upwardly toward the valve seat 84 when the pressure regulating device is subjected to a predetermined rate of deceleration and to a flow surge of the fluid supplied from the master cylinder.

The operation of the fluid pressure regulating device 34 thus constructed and arranged will now be described with concurrent reference to FIGS. 2 and 3.

When, now, the foot pedal 22 is depressed, then the master cylinder 22 delivers the fluid pressure $P_m$. This fluid pressure $P_m$ as it is directed to the front wheel cylinders 30 and 30' through the fluid line 24 and branch lines 28 and 28' whereby the front brakes 32 and 32' are actuated respectively. The fluid pressure $P_m$ is, on the other hand, directed to the two inlet ports 36 and 38 of the fluid pressure regulating device 34 through the fluid line 26. The fluid pressure in the inlet port 36 passed to the outlet port 40 of the regulating device 34 through the cavity 56, a clearance between the plunger 58 and lip seal 62, and the chamber 60 in this order. Under this condition, the outgoing fluid pressure $P_r$ is equal to the incoming fluid pressure $P_m$ because an unrestricted fluid communication is established between the cavity 56 and chamber 60. The fluid pressure $P_r$ discharged from the regulating device 34 through the outlet port 40 is directed to the rear wheel cylinders 46 and 46' through the fluid line 42 and branch lines 44 and 44', respectively, causing the rear brakes 48 and 48' to be actuated. In this condition, the fluid pressure acts on the plunger 58 so that the plunger 58 is urged toward the cavity 68 with a force $P_m \times A_2$. When this force $P_m \times A_2$ becomes greater than the opposing force $F_1$ of the inner preload spring 74, then the plunger 58 is moved rearwardly, viz., toward the piston 70 until the annular projection 58a is forced against the lip seal 62. The chamber 60 is now isolated from the cavity 56 and accordingly the fluid communication between the inlet and outlet ports 36 and 40, respectively, is blocked. If the critical fluid pressure causing the plunger 58 to be moved into this position is $P_s$, then in view of the fact that such movement of the plunger 58 is opposed by the force $F_1$, $$P_s \cdot A_2 = F_1$$

hence $$P_s = F_1/A_2 \qquad \text{Eq. 1-1}$$

When $P_m \leq P_s$ in which instance the plunger 58 is positioned to have its annular projection 58a spaced apart from the lip seal 62, there holds a relation $$P_r = P_m \qquad \text{Eq. 1-2}$$

As the fluid pressure $P_m$ further increases after the plunger 58 has been moved to close the clearance between the lip seal 62 and the annular projection 58a of the plunger, this fluid pressure now acts on the plunger 58 in a manner to move the plunger in the reverse direction, viz., away from the cavity 68. The clearance between the lip seal 62 and the annular projection 58a of the plunger 58 is consequently reopened, allowing the fluid pressure $P_m$ in the cavity 56 to be passed to the chamber 60 with a resultant increase in the fluid pressure $P_r$ delivered from the outlet port 40. Thus, when the supplied fluid pressure $P_m$ is equal to or greater than the critical pressure $P_s$, viz., when $P_m \geq P_s$, the plunger 58 will be held in a balanced position in which.

$$P_r \cdot A_1 = P_m \cdot (A_1 - A_2) + F_1$$

hence $$P_r = (A_1 - A_2/A_1) \cdot P_m + (F/A_1)$$
$$= k \cdot P_m + F_1/A_1, \qquad \text{Eq. 1-3}$$

where $$k = (A_1 - A_2)/A_1.$$

The fluid pressure $P_r$ which is delivered from the outlet port 40 under the control of the proportioning valve section 52 of the pressure regulating device 34 is in this manner given by either of the Eqs. 1-2 and 1-3 for any fluid pressure $P_m$. Thus, as the input fluid pressure $P_m$ increases from zero, then the output fluid pressure $P_r$ incresses at the same rate until the critical pressure level of $P_s$ is reached by the former and increases at the rate of $k$ times the rate of increase of the fluid pressure $P_m$ (wherein $k$ is smaller than 1) when the input fluid pressure is greater than the critical level $P_s$, as graphically indicated in FIG. 4.

When the input fluid pressure $P_m$ and consequently the braking force on the wheels increase, then the ratio of the braking force $B$ versus the overall weight $W$ of the motor vehicle also increases. If, thus, $B = C \cdot P_m$ where $C$ is a positive constant, the ratio of the braking force B to the overall vehicle weight W can be written as a ratio of the rate of deceleration G and a gravitational acceleration g as follows:

$$G/g = B/W. \qquad \text{Eq. 1-4}$$

When this deceleration rate ratio $G/g$ reached a predetermined value of $(G/g)_o$ which is the function of the angle $\theta$ of inclination of the pressure regulating device 34, the ball member 80 of the inertia-responsive valve section 54 is caused to roll up the incline 78a in the cavity 78 and is consequently seated on the associated valve seat 84. The aperture 84a in the valve seat member 84 is now closed so that the fluid pasage 82 is isolated from the cavity 78. The fluid pressure $P_m$ which has been directed from the inlet port 38 to the passage 82 through the cavity 78 and the orifices 86a in the ball support member 86 and which has accordingly acted upon the piston 70 can be maintained at a fixed level. This fixed level, written as $P_g$, is the level of the fluid pressure $P_m$ obtaining at the moment when the aperture 84a in the valve seat member 84 is closed by the ball member 80. From this, it is apparent that if the predetermined value $(G/g)_o$ is written in the form of $f(\theta)$ which is the function of the angle $\theta$ then there holds $$P_g = [f(\theta)/C] \cdot W. \qquad \text{Eq. 1-5}$$

The piston 72 of the proportioning valve section 52 is urged toward the stepped annular wall portion 50a of the housing 50 by reason of this fluid pressure $P_g$ against the combined forces $F_1$ and $F_2$ of the inner and outer preload springs 74 and 76 in the cavity 68. As a consequence, the piston 70 is moved to a balanced position in which the product of the fluid pressure $P_g$ and the cross sectional area $A_3$ of the piston is equalized with the sum of the forces $F_1$ and $F_2$ of the inner and outer springs 74 and 76. Under this condition, the inner spring 74 acts to press the plunger 58 away from the piston 70 with the force $F_1$, while the force $F_2$ of the outer spring 76 is borne by the annular wall portion 50a of the housing 50. The condition for equilibrium of the piston 70 is therefore written from Eq. 1-5 as $$F_1 + F_2 = P_g \cdot A_3 = [f(\theta)/C] \cdot A_3 \cdot W. \qquad \text{Eq. 1-6}$$

The forces $F_1$ and $F_2$ of the inner and outer springs 74 and 76 are respectively the sums of the amounts of preset loads $f_1$ and $f_2$ and the products of the spring constants $K_1$ and $K_2$ of the springs 74 and 76 and the amounts compression of the springs. The relation between the forces $F_1$ and $F_2$ is such that the following equation is satisfied:

$$F_2 = f_2 + (K_2/K_1)(F_1 - f_1). \qquad \text{Eq. 1-7}$$

From this and Eq. 1-6, the force $F_1$ is obtained as $$F_1 = \frac{\dfrac{f(\theta)}{C} \cdot A_3 \cdot W - \left(f_2 - \dfrac{K_2}{K_1} \cdot f_1\right)}{1 + K_2/K_1}. \qquad \text{Eq. 1-8}$$

Substitution of Eq. 1-8 into Eq. 1-1 results in $$P_s = \frac{\dfrac{f(\theta)}{C} \cdot A_3 \cdot W - \left(f_2 - \dfrac{K_2}{K_1} \cdot f_1\right)}{A_2(1 + K_2/K_1)}. \qquad \text{Eq. 1-9}$$

When $P_m \geq P_s$, in view of Eq. 1-3, $$P_r = k \cdot P_m + F_1/A_1$$

$$= k \cdot P_m + \frac{\dfrac{f(\theta)}{C} \cdot A_3 \cdot W - \left(f_2 - \dfrac{K_2}{K_1} \cdot f_1\right)}{A_1(1 + K_2/K_1)}.$$

Eq. 1-10

Figure 5:
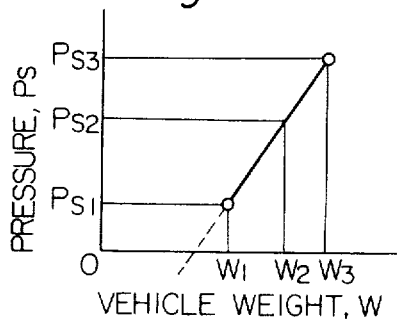
FIG. 5 is a graph showing a relation between a critical pressure $P_s$ hereinafter defined and the overall weight of the motor vehicle as attained with use of the regulating device shown in FIG. 3.

From this it is apparent that through suitable selection of the variables in Eq. 1-9 in a manner to make the values of $(f_2 - f_1 \cdot K_2/K_1)$, $A_2$ and $A_3$ positive, a relation between the critical fluid pressure $P_s$ and the vehicle weight W as shown in FIG. 5 will be obtained in which the ratio of the critical pressure $P_s$ to the vehicle weight W are increased from $P_{s1}$ to $P_{s2}$ and from $P_{s2}$ to $P_{s3}$ as the vehicle weight W increases from $W_1$ to $W_2$ and from $W_2$ to $W_3$.

Figure 6:
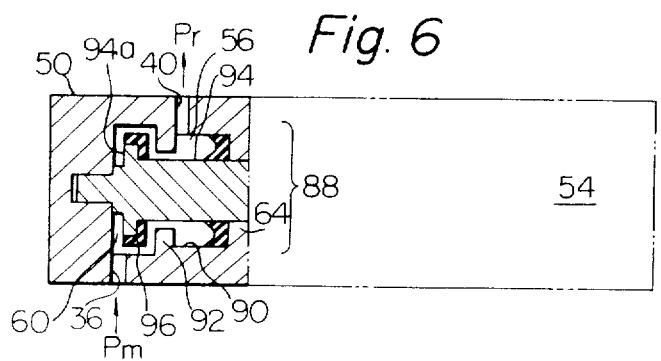
FIG. 6 is a fragmentary longitudinal sectional view showing a modification of the regulating device shown in FIG. 3.

FIG. 6 illustrates a modification of the device shown in FIG. 3, wherein a pressure limiting valve is used in lieu of the proportioning valve. The portion which is left blank in FIG. 6 is entirely identical to that of the device shown in FIG. 3, thus including the spring loaded piston 70 slidable within the cavity 68 and the inertia-responsive valve section 54 illustrated in FIG. 3. Thus, only part of the pressure limiting section is seen in FIG. 6, this part being designated by reference numeral 88.

The housing 50 has formed in this particular part 88 of the pressure limiting section a generally cylindrical cavity 90 extending in the axial direction of the housing. An annular projection 92 is formed on the cylindrical wall of the housing 50 defining the cavity 90 and spaced apart from the opposite axial ends of the cavity. The inlet port 36 leading from the master cylinder is opened into an axially upper portion of the cavity 90 and the outlet port 40 leads from an axially lower portion of the cavity 90. The inlet and outlet ports 36 and 40 are thus respectively located anterior and posterior to the annular projection 92 intervening between the upper and lower portions of the cavity 90 as seen in FIG. 6. The upper portion of the cavity 90 may correspond to the chamber 60 in the proportioning valve section 52 shown in FIG. 3. A plunger 94 is axially movable throughout the cavity 90, having a rear end portion projecting into the cavity 68 through the stepped annular projection 50a of the housing 50 as shown in FIG. 3. An annular clearance is thus formed between the plunger 94 and the annular projection 92, providing communication between the upper and lower portions of the cavity 90. The plunger 94 has a flange or annular projection 94a which is located between the upper end wall of the cavity 90 and the annular projection 92 of the housing 50. The annular projection 94a of the plunger 94 is thus engageable with the annular projection 92 of the housing 50 when the plunger 94 is axially moved rearwardly, for thereby interrupting the communication between the upper and lower portions of the cavity 90 and accordingly between the inlet and outlet ports 36 and 40, respectively, of the section 88. A resilient material 96 may be attached to the lower face of the annular projection 94a for being closely received by the annular projection 92 of the housing when the former abuts against the latter. A seal 64 is mounted around the plunger 94 for the purpose of hermetically isolating the cavity 90 from the cavity 68 (FIG. 3) into which the plunger 94 extends.

In the pressure regulating device thus constructed, the plunger 94 is constantly biased forwardly by reason of the variable force of the inner spring 74 (FIG. 3) and forced rearward when the input fluid pressure $P_m$ is led to the valve section 88 through the inlet port 36. When the outlet port 40 is isolated from the inlet port 36 upon rearward movement of the plunger 94 as a result of an increase in the fluid pressure $P_m$ to a critical level $P_s$, the fluid pressure $P_4$ is maintained at a constant level which is substantially equal to $P_s$. The relationship between the fluid pressures $P_m$ and $P_r$ is varied as the critical pressure $P_s$ is varied from $P_{s1}$ to $P_{s2}$ and to $P_{s3}$ as indicated by curves $c_1$, $c_2$ and $c_3$, respectively, in FIG. 7. The ratio of the front and rear braking forces $B_f$ and $B_r$, respectively, versus the overall vehicle weight $W$ varies in accordance with such increase in the critical pressure $P_s$ as indicated by curves $d_1$, $d_2$ and $d_3$ in FIG. 8. From FIG. 8, it is understood that the characteristics curves $d_1$, $d_2$ and $d_3$ largely approximate the desired characteristics curves $a_1$, $a_2$ and $a_3$ which were previously mentioned.

Figure 9:
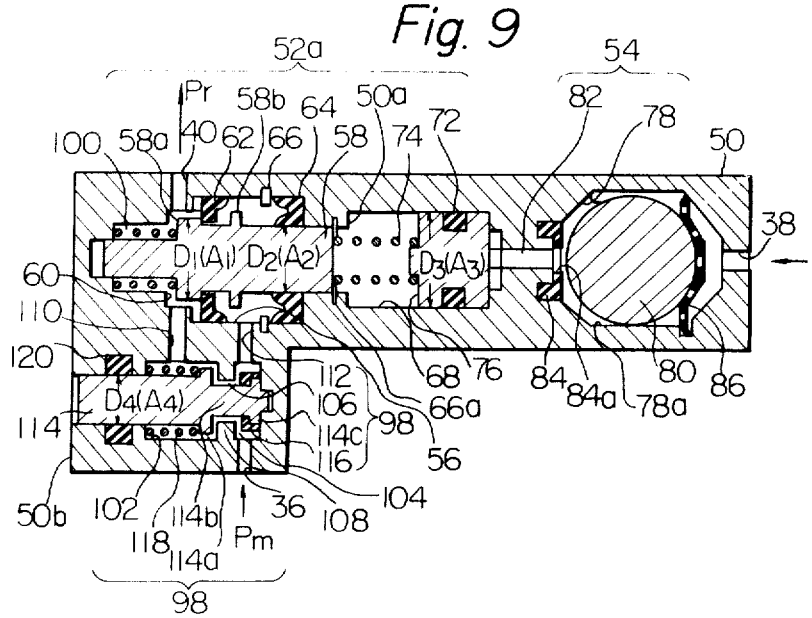
FIG. 9 is a longitudinal sectional view showing another preferred embodiment of the regulating device according to the present invention.

FIG. 9 illustrates another embodiment of the pressure regulating device which is adapted to provide the performance characteristics approximating these curves $a_1$, $a_2$ and $a_3$. The regulating device herein shown largely includes a modified form of proportioning valve section which is now designated by reference numeral 52a, inertia-responsive valve section 54 which is similar to the counterpart of the device shown in FIG. 3 and, in addition to these, a control valve section which is designated generally by reference numeral 98.

The proportioning valve section 52 has a plunger 58 which is configured and sized similarly to its counterpart of the device shown in FIG. 3, thus having an annular projection 58a with an outside diameter $D_1$ and a cross sectional area $A_1$ and a stem portion having an outside diameter $D_2$ and a cross sectional area $A_2$ as indicated in FIG. 9. This plunger 58 extends through the stepped annular wall 50a of the housing 50 into a cavity 68 in which a piston 70 is axially slidable. This piston 70 is so sized as to have an outside diameter $D_3$ and a sectional area $A_3$ as previously discussed. A preload spring 74 is mounted within this cavity 68, seated on the opposed faces of the plunger 58 and piston 70. In lieu of the outer preload spring 76 of the proportioning valve section 52 shown in FIG. 3, a second preload spring 100 is associated with the plunger 58. This second preload spring 100 is seated at one end on the upper face of the annular projection 58a and at the other on an upper end wall defining a chamber 60 communicating with the cavity 56, thus biasing the plunger 58 toward the piston 70 against the opposing force of the spring 74 in the cavity 68. The forces exerted by the upper and lower springs 100 and 74, respectively, are herein assumed to be $F_1$ and $F_2$ where $F_1$ is assumed to be larger than $F_2$. The remaining parts and elements of the proportioning valve section 52a as well as the whole construction of the inertia-responsive valve section 54 are entirely the same as those shown in FIG. 3 and are accordingly designated by like reference numerals. Thus, similarly to the valve section 52 of FIG. 3, the chamber 60 lead to the fluid outlet port 40 which communicates with rear wheel cylinders 46 and 46' (FIG. 2).

The control valve section 98 is shown as positioned in parallel to the proportioning valve section 52a and formed in a portion 50b of the housing 50. Thus, the housing portion 50b has formed therein a generally cylindrical bore 102 and a chamber 104. The bore 102 and chamber 104 are axially aligned together and communicate with each other through a passage 106 which is defined by an annular projection 108 formed on the housing portion 50b, as illustrated. The bore 102 and chamber 104 are in constant communication with the chamber 60 and cavity 56 of the proportioning section 52a through passages 110 and 112, respectively. A plunger 114 is axially slidable throughout these bore 102, chamber 104 and passage 106 and supported on the housing portion 50b at its axial end portions. The plunger 114 has an annular projection 114a, which is located adjacent the upper face of the annular projection 108 of the housing portion 50b, a reduced portion 114b extending through the passage 106 forming an annular clearance (not numbered) therearound, and an annular projection 114c formed at the rear end thereof and engageable with the lower face of the annular projection 108 of the housing portion 50b. The plunger 114 has its stem portion sized to have an outside diameter $D_4$ and a cross sectional area $A_4$ and is exposed at its upper end to the atmosphere, as indicated. A resilient material 116 may preferably be attached to the upper face of the annular projection 114c in the chamber 104 so that the projection 114c is closely received on the annular projection 108 of the housing portion 50b when the plunger 114 is moved forwardly. The bore 102 has accommodated therein a preload spring 118 which is seated on the upper face of the annular projection 114a of the plunger 114 and on an upper end wall defining the bore 102, thereby biasing the plunger 114 rearwardly by a force $F_3$. Designated by reference numeral 120 is an annular seal which is closely interposed between the stem portion of the plunger and the housing portion 50b so as to hermetically seal the bore 102 from the atmosphere. The chamber 104 is in constant communication with the fluid inlet port 36 leading from the master cylinder 20 (FIG. 2) of the braking system. The pressure regulating device constructed in this manner is inclined in its entirety at the angle of $\theta$ from the horizontal plane with its inertia-responsive valve section 54 directed downwardly and rearwardly, as previously noted.

When, in operation, the foot brake is depressed and consequently the fluid pressure $P_m$ is directed from the master cylinder to the fluid inlet port 36, this fluid pressure is passed to the passage 112 through the chamber 104 of the control valve section 98. Since, in this condition, the plunger 58 is incipiently urged toward the piston 70 by a differential biasing force $F_1 - F_2$ by the upper and lower preload springs 100 and 74, respectively, the annular projection 58a of the plunger 58 is forced against the lip seal 62 with the result that the cavity 56 is isolated from the chamber 60 and accordingly from the fluid outlet port 40. The plunger 114 of the control valve section 98 on the other hand is moved rearward by the force $F_3$ of the preload spring 118. The fluid pressure $P_m$ in the chamber 104 is thus directed to the fluid outlet port 40 through the annular clearance between the reduced portion 114b of the plunger 114 and the annular projection 108 of the housing portion 50b, the bore 102 in the housing portion, the passage 110 between the proportioning and control valve sections, and the chamber 60 in the proportioning valve section. The fluid pressure $P_r$ in the outlet port 40 is equal to the fluid pressure $P_m$ so that the front and rear wheel cylinders receive equal fluid pressures at this stage of the braking operation.

As the input fluid pressure $P_m$ increases, the forces $P_m \times A_2$ which is the product of the pressure $P_m$ acting on the plunger and the sectional area $A_2$ of the stem portion thereof acts in cooperation with the force $F_1$ of the upper preload spring 100 in a manner to press the plunger 58 rearwardly, viz., toward the piston 70 in the cavity 68.

When, on the other hand, the piston 70 is held in the lowermost position remotest from the stepped annular wall 50a of the housing 50 as illustrated in FIG. 9, the plunger 58 is urged away from the piston 70 by the force $F_2$ of the preload spring 74 in the cavity 68. The piston 70 in this condition is subjected to an upward force resulting from the fluid pressure obtaining in the passage 82. This fluid pressure in the passage 82 is equal to the input fluid pressure $P_m$ passed from the master cylinder 20 (FIG. 2) through the fluid inlet port 38 and cavity 78, when the ball member 80 is unseated from the valve seat member 84. When, thus, the fluid pressure $P_m$ in the passage 82 is increased to such an extent that the force $P_m \times A_3$ acting to urge the piston 70 away from the passage 82 is greater than the opposing force $F_2$ of the lower preload spring 74, then the piston 70 is moved toward the annular wall 50a of the housing 50. As the fluid pressure $P_m$ in the inlet port 38 and accordingly in the passage 82 further increase and reach a predetermined level $P_o$, the plunger 58 is moved forwardly so that the annular projection 58a thereof leaves the annular lip seal 62 in the cavity 56, thereby establishing the fluid communication between the cavity 56 and chamber 60 through the annular clearance between the plunger 58 and the lip seal 62. Here, it is assumed that the force of the lower spring 74 is increased to $F_2$, equal to $P_o \times A_3$ and resultant force of the force $F_1$ of the spring 100 and the force $P_o \times A_2$ which press the plunger 58 rearwardly.

The condition for equilibrium of the plunger 58 in this condition is written as:

$$F_1 + P_o \cdot A_2 = P_o \cdot A_3$$

so that $$P_o = F_1/(A_3 - A_2) \qquad \text{Eq. 2-1}$$

The fluid pressure $P_m$ directed into the bore 102 of the control valve section acts on the plunger 114 so that the plunger 114 is urged by a force which is expressed as $P_m \times A_4$. When, thus, this force $P_m \times A_4$ becomes greater than the opposing force $F_3$ of the preload spring 118, then the plunger 114 is moved forwardly against the force $F_3$ of the spring 118 until the annular projection 114c of the plunger 114 is forced against the annular projection 108 of the housing portion 50b, thereby interrupting the fluid communication between the chamber 104 and bore 102. If the critical fluid pressure acting to move the plunger 114 to this position is $P_c$, then there holds $$P_c \cdot A_4 = F_3,$$

so that $$P_c = F_3/A_4 \qquad \text{Eq. 2-2}$$

It is, in this instance, important that the proportioning and control valve sections 52a and 98 have dimensions which are selected so that the fluid pressure $P_c$ is larger than the above mentioned fluid pressure $P_o$. With such dimensional arrangements of the valve sections 52a and 98, the plunger 58 of the proportioning valve section 52a is forwardly moved so as to establish the fluid communication between the cavity 56 and chamber 60 at an instant earlier than the forward movement of the plunger 114 of the control valve section 98 to a position blocking the fluid communication between the bore 102 and chamber 104. As a consequence, the control valve section 98 is maintained in a condition in which the communication between the bore 102 and chamber 104 is established as long as the proportioning valve section 52a has its plunger 58 held in the position interrupting the communication between the cavity 56 and chamber 60.

As the input fluid pressure $P_m$ still further increases, the braking force $B$ on the wheels increases with the consequent increase in the rate of deceleration $G$ of the motor vehicle. When a predetermined rate of deceleration $G_s$ of the motor vehicle is reached by application of the brakes, then the ball member 80 in the inertia-responsive valve section 54 is caused to forwardly roll up the incline 78a against its gravity and abuts to the valve seat member 84, thereby closing the aperture 84 in the valve seat member and interrupting the fluid communication between the cavity 78 and the passage 82. On the other hand, the following relations hold:

$$B = C \cdot P_m, \quad \text{Eq. 2-3}$$

and $$G/g = B/W, \quad \text{Eq. 2-4}$$

where $C$ is a constant and $g$ is a gravitational acceleration. The critical rate of deceleration $G_s$ is related to the angle $\theta$ of inclination of the regulating device from the horizontal plane, and such, there holds $$G_s/g = f(\theta) \quad \text{Eq. 2-5}$$

It therefore follows that, as the overall weight $w$ of the motor vehicle increases, the braking force $B$ resulting in the rate of deceleration $G_s$ and accordingly the critical fluid pressure resulting in such braking force increase. If this critical fluid pressure is denoted by $P_g$, then there results the following relation between the critical fluid pressure $P_g$ and the vehicle weight $W$:

$$P_g = f(\theta)/C \cdot W. \quad \text{Eq. 2-6}$$

It is thus important that the inertia-responsive valve section 54 be dimentioned so that the critical fluid pressure $P_g$ is greater than the predetermined fluid pressure $P_o$ of Eq. 2-1, whereby the plunger 58 can be forwardly moved to establish the fluid communication between the cavity 56 and chamber 60 before the ball member 80 closes the aperture 84a in the valve seat member 84.

As the input fluid pressure $P_m$ still further in increases in the above described condition, the fluid pressure in the inlet port 36 and accordingly in the passage 112 of the control valve section 98 increases but the fluid pressure in the passage 82 between the proportioning and inertia-responsive valve sections 54 and 52a respectively, is maintained at the level of $P_g$ with the result that the force which is transferred from the piston 70 to the plunger 58 through the preload spring 74 is maintained at $A_3 \times P_g$. The plunger 58 in this condition is subjected to a rearward force $P_m \times A_2$ which is the product of the fluid pressure $P_m$ acting the cross sectional area $A_2$ of the stem portion of the plunger 58. When the fluid pressure $P_m$ reaches a critical level $P_2$ so that a force $P_s \times A_2$ equals a force $P_g \times A_3$ which is the product of the above mentioned critical fluid pressure $P_g$ and the sectional area $A_3$ of the piston, then the plunger 58 starts to rearwardly move. In this condition, the balance of the forces on the plunger 58 is written as:

$$F_1 + A_2 \cdot P_s = A_3 \cdot P_g \quad \text{Eq. 2-7}$$

Substitution of Eq. 2-7 into Eq. 2-7 results in $$F_1 + A_2 \cdot P_s = A_3 \cdot f(\theta)/C \cdot W,$$

so that $$P_s = (A_3/A_2) \cdot f(\theta)/C \cdot W - F_1/A_1 \quad \text{Eq. 2-8}$$

Arrangements shoul thus be made so that the fluid pressure level $P_s$ is greater than each of the predetermined levels $P_c$ and $P_{os}$ so that both the control valve section 98 and the inertia-responsive valve section 54 become closed before the critical level $P_s$ is reached by the input fluid pressure $P_m$.

If the input fluid pressure $P_m$ delivered from the master cylinder 20 (FIG. 2) still increases in excess of the level $P_s$, the plunger 58 maintained in a balanced condition by reason of the equilibrium between the rearward force equal to the sum of the force $F_1$ of the preload spring 100 and the product of the fluid pressure $P_r$ in the chamber 60 and the cross sectional area $A_1$ of the annular projection 58a of the plunger 58 and the forward force equal to the sum of the product of the fluid pressure $P_m$ and the difference $A_1 - A_2$ between the cross sectional areas of the annular projection 58a and stem portion of the plunger 58 and the product of the fluid pressure $P_g$ and the sectional area $A_3$ of the piston 70 as imparted to the plunger 58 through the preload spring 74. Thus, the input and output fluid pressures $P_m$ and $P_r$ increase with the following relation maintained therebetween:

$$F_1 + A_1 \cdot P_r = (A_1 - A_2) \cdot P_m + A_3 \cdot P_g$$
$$= (A_1 - A_2) \cdot P_m + A_3 \cdot [f(\theta)/C] \cdot W,$$

so that $$P_r = \frac{A_1 - A_2}{A_1} \cdot P_m + \left(\frac{A_3}{A_1} \cdot \frac{f(\theta)}{C} \cdot W - \frac{F_1}{A_1}\right)$$
$$= k \cdot P_m + \left(\frac{A_3}{A_1} \cdot \frac{f(\theta)}{C} \cdot W - \frac{F_1}{A_1}\right), \quad \text{Eq. 2-9}$$

where $k = (A_1 - A_2)/A_1$.

Figure 4:
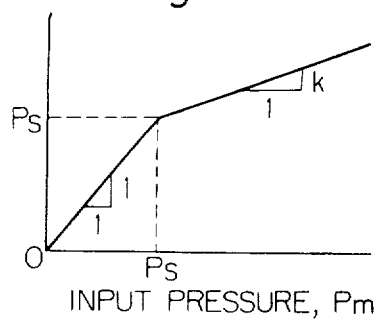
FIG. 4 is a graph showing a relation between the input and outer fluid pressures $P_m$ and $P_r$, respectively, as attained in the regulating device shown in FIG. 3.

It is thus apparent that the graphic representation of FIGS. 4 and 5 generally applied to the expression of the above Eq. 2-9 wherein the output fluid pressure $P_r$ increases at the same rate as the input fluid pressure $P_m$ until the pressure $P_m$ reaches the critical level $P_s$ and afterwards at the constant rate $k$ as the input fluid pressure $P_m$ still increases. Furthermore, the critical fluid pressure $P_s$ increase as the vehicle weight increases as previously noted with reference to FIG. 5.

FIG. 10 illustrates a fluid pressure regulating device of the pressure limiting character as modified from the device shown in FIG. 9. As in the case of the device shown in FIG. 6, the pressure regulating device herein shown includes a pressure limiting valve section which is designated by reference numeral 122. This valve section 122 is combined with an inertia-responsive valve section 54 which is entirely similar to that shown in FIG. 9 and a control valve section 98a which per se is essentially similarly constructed to its counterpart 98 of the device shown in FIG. 9. The portion corresponding to the inertia-responsive valve section 54 is thus left blank in FIG. 10 while the parts of the control valve section 98a which are in correspondence with those of the valve section 98 of FIG. 9 are designated by like reference numerals.

The pressure limiting valve section 122 has formed in the housing 50 a generally cylindrical cavity 124 extending in the axial direction of the main housing 50. An annular projection 126 is formed on the cylindrical wall defining the cavity 124, spaced part from the axial ends of the cavity as shown. Upper and lower portions of the cavity 124 thus formed on both sides of the annular projection 126 are in constant communication through the passages 112 and 110 with the chamber 104 and bore 102, respectively, of the control valve section 98a. The lower portion of the cavity 124 leads to the rear wheel cylinders through the outlet port 40. As seen in FIG. 10, the control valve section 98a as a whole is inverted in the fore-and-aft direction from the position of the control valve section 98 of the regulating device shown in FIG. 9. A plunger 128 having an annular projection 128a is axially slidable throughout the cavity 124, projecting at its rear end portion into the cavity 68 (FIG. 9) through the stepped annular wall 50a of the housing 50. An annular clearance is thus formed between the stem portion of the plunger 128 and the annular projection 126 of the housing 50, providing communication between the upper and lower portions of the cavity 124. The annular projection 128a of the plunger 128 is located between the upper end wall of the cavity 124 and the annular projection 126 of the housing 50. The annular projection 128a of the plunger 128 is thus engageable with the annular projection 126 of the housing when the plunger 128 is axially moved rearwardly, for thereby interrupting the communication between the upper and lower portions of the cavity 124. A preload spring 100 having a preset load substantially similar to those of its counterpart in the device of FIG. 9 is seated between the upper end wall of the cavity 124 and the upper face of the annular projection 128a of the plunger 128, biasing the plunger 128 toward the cavity 68 (FIG. 9). A resilient member 130 is attached to the annular projection 128a for providing close contact with the annular projection 126 of the housing 50, while the stem portion of the plunger 138 is received on a seal 64 which is held in position by seal stop member 66.

Figure 7:
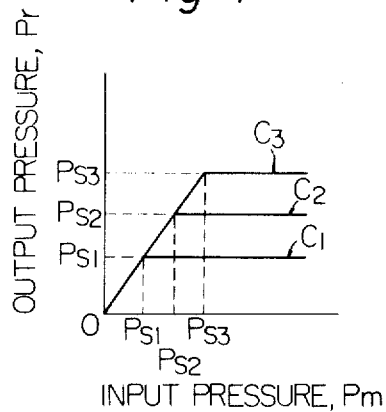
FIG. 7 is a graph showing a relation between the input and output fluid pressures $P_m$ and $P_r$, respectively, as attained in the regulating device shown in FIG. 6.
Figure 8:
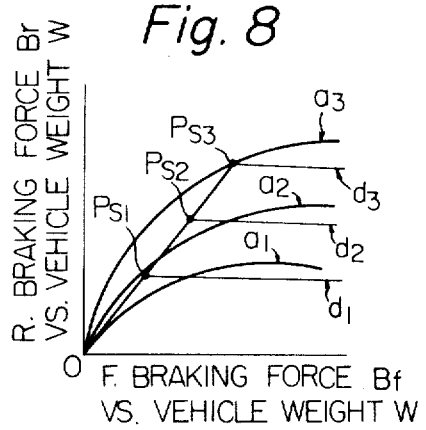
FIG. 8 is a graph showing proportions of the front and rear braking forces as varied in accordance in the variation in the overall weight of the motor vehicle.

In the pressure regulating device having the above described construction, the relationship between the input and output fluid pressures $P_m$ and $P_r$ is varied as the critical pressure $P_s$ mentioned in connection with the device shown in FIG. 9, is varied from $P_{s1}$ to $P_{s2}$ and to $P_{s3}$ as generally indicated by the curves $c_1$, $c_2$ and $c_3$, respectively, in FIG. 7. Thus, the graphic representation of FIG. 8 applies generally to the operation of the regulating device having the construction shown in FIG. 10 so that the ratio of the front and rear braking forces $B_f$ and $B_r$, respectively, versus the overall vehicle weight W varies in accordance with the increase in the critical pressure $P_s$ as indicated by the curves $d_1$, $d_2$ and $d_3$ in FIG. 8.

FIG. 11 illustrates still another modification of the fluid pressure regulating device shown in FIG. 3. The regulating device wherein shown has interposed between the proportioning valve and inertia-responsive valve sections a control valve section which is generally indicated by reference numeral 132. The proportioning valve section, which is now designated by reference numeral 52b, is entirely similar to the proportioning valve section 52 of the device shown in FIG. 3, except in that the outer preload spring 76 used in the latter is removed from the former as in the case of the device shown in FIG. 9. The inertia-responsive valve section, designated by reference numeral 54, is formed in a housing portion 50c projecting from the main housing 50 and constructed entirely similarly to its counterpart in FIG. 3 or in FIG. 9. No detailed description on the construction of the proportioning valve section 52b and inertia-responsive valve section will be incorporated herein because the parts and elements designated by like reference numerals of these valve sections are all in correspondence with each other in both of the regulating devices shown in FIGS. 3 and 9. Different from the embodiments which have thus far described and shown, the pressure regulating device shown in FIG. 11 has its proportioning valve section 52b extending substantially at a right angle to the inertia-responsive valve section 54 which is inclined at the angle of $\theta$ from the horizontal plane as shown.

The control valve section 132 has formed in the housing 50 a generally cylindrical cavity 134 extending substantially at a right angle to the axis of the cavities 56 and 68 of the proportioning valve section 52b. The cavity 134 is in constant communication with a passage 136 terminating at the lower end face of the piston 70 of the proportioning valve section 52b and merges at the rear end into a chamber 138 which is smaller in diameter than the cavity 134. This chamber 138 is in constant communication with a passage 140 leading from the cavity 78 of the inertia-responsive valve section 54. A plunger 142 is axially movable throughout the cavity 134 and chamber 138 and slidably received on the housing 50 at its axial end portions. The plunger 142 has a flange or annular projection 142a spaced from the foremost end wall of the cavity 134, a reduced portion 142b extending rearwardly from this annular projection 142a and an annular projection 142c formed on the rearmost end portion of the reduced portion 142b and axially movable through the chamber 138. A resilient member 144 is preferably attached to the front face of the rear annular projection 142c for the reason to be described later. The plunger 142 as a whole is biased rearwardly by means of a preload spring 146 which is seated between the front end wall of the cavity 134 and the front annular projection 142a. An apertured valve plate 148 is positioned around the reduced portion 142b of the plunger 142 through a central aperture (not numbered) formed therein with a diameter appreciably larger than the outside diameter of the reduced portion 142a for providing an annular clearance between the reduced portion 142b and the inner peripheral edge of the valve plate 148. The valve plate 148 is provided with an annular resilient member 150 extending circumferentially on the rear face of the valve plate 148. The valve plate 148 is free to move between the front and rear annular projections 142a and 142c so as to be engageable with the latter or with a rear end wall of the cavity 134. When the valve plate 148 is thus brought into engagement with the rear annular projection 142c of the plunger 142 through relative movement therebetween, the cavity 134 is closely isolated from the chamber 138 by means of the resilient member 144 attached to the annular projection 142c. An outer preload spring 152 is seated between the front end wall of the cavity 134 and the front face of the valve plate 148, thus biasing the valve plate 148 toward the stepped rear end wall of the cavity 134. A stop member 154 extends from the front end wall of the cavity 134 and between the inner and outer preload springs 146 and 152, terminating close to the front face of the valve plate 148, as shown.

In the construction of the device shown in FIG. 11, the plunger 58 of the proportioning valve section 52b is assumed to have an outside diameter $D_1$ and a cross sectional area $A_1$ at its annular projection 58a and an outside diameter $D_2$ and a cross sectional area $A_2$ at its stem portion as indicated, while the piston 70 is assumed to have an outside diameter $D_3$ and a cross sectional area $A_3$. The plunger 142 of the control valve section 132, on the other hand, is assumed to have an outside diameter $D_4$ and a cross sectional area $A_4$. The chamber 138 is assumed to have a diameter $D_5$ and a cross sectional area $A_5$, as indicated. The preload spring 74 of the proportioning valve section 52b is assumed to have a force $F_1$ while the inner and outer preload springs 146 and 152 are assumed to have forces $F_2$ and $F_3$, respectively.

The fluid inlet ports 36 and 38 opened into the cavities 56 and 78, respectively, of the valve sections 52b and 54 lead from the master cylinder 20 (FIG. 2) while the fluid outlet port 40 leads from the chamber 60 of the section 52b to the rear wheel cylinders, similarly to the device shown in FIG. 3.

When, in operation, the plunger 58 of the proportioning valve section 52b is held in the shown position in which the annular projection 58a is spaced apart from the lip seal 62, the input fluid pressure $P_m$ directed from the master cylinder 20 (FIG. 2) into the fluid inlet port 36 of the valve section 52b is passed, without being varied, to the fluid outlet port 40 through the cavity 56, and the chamber 60. Thus, the output fluid pressure $P_r$ is equal to the input fluid pressure $P_m$ at the initial stage of the braking operation. The fluid pressure $P_m$, however, acts to urge the plunger 58 downwardly, viz., toward the cavity 68 by a force $P_m \times A_2$. When this force $P_m \times A_2$ overcomes the opposing force $F$ from the spring 74 in the cavity 68, then the plunger 58 starts to move toward the cavity 68 until the annular projection 58a thereof is brought into contact with the lip seal 62. The chamber 60 is consequently isolated from the cavity 56 so that the fluid communication between the inlet and outlet ports 36 and 40, respectively, is interrupted. If the force urging the plunger 58 away from the cavity 68 is denoted by F, then the critical pressure $P_s$ causing the plunger 58 to this particular position will satisfy the following relation:

$$P_s \cdot A_2 = F,$$

so that $$P_s = F/A_2 \qquad \text{Eq. 3-1}$$

When the input fluid pressure $P_m$ is smaller than this critical level $P_s$ as during the incipient stage of the braking operation, then as above mentioned $$P_r = P_m \qquad \text{Eq. 3-2}$$

As the fluid pressure $P_m$ further increases after the proportioning valve section 52b has been closed, the pressure $P_m$ acts to move the plunger 58 in a reverse direction, viz., away from the cavity 68 so that the fluid pressure $P_m$ is allowed into the chamber 60 from the cavity 56, causing the output fluid pressure $P_r$ to rise in proportion to the input fluid pressure. When, thus, the input fluid pressure $P_m$ is greater than the above mentioned critical level $P_s$, the condition for equilibrium of the plunger 58 is written as $$P_r \cdot A_1 = P_m(A_1 - A_2) + F,$$

hence, $$P_r = (A_1 - A_2/A_1) \cdot P_m + F/A_1$$
$$= k_1 \cdot P_m + F/A_1, \qquad \text{Eq. 3-3}$$

where $$k_1 = (A_1 - A_2)/A_1.$$

The output fluid pressure $P_r$ which is thus regulated by the proportioning valve section 52b is thus dictated by Eqs. 3-2 and 3-3 and, therefore, rises at the same rate as the input fluid pressure $P_m$ when the fluid pressure $P_m$ is smaller than the critical level $P_s$ and at the rate of $k_1$ when the fluid pressure $P_m$ is in excess of the level $P_s$ generally in a manner indicated in FIG. 4. The force by which the plunger 58 is forced away from the cavity 68 by the preload spring 74 is equal to the force $P_h \times A_3$ which is the product of the pressure $P_h$ acting on the piston 70 and delivered from the passage 136 and the cross sectional area $A_3$ of the piston 70. Under this condition, the pressure $P_h$ is greater than $F_1/A_3$ so that the piston 70 is moved toward the plunger 58 by this fluid pressure $P_h$ and the plunger 58 is forced away from the cavity 68 through the spring 74 seated thereon. The above mentioned force F acting to urge the plunger 58 upwardly is equal to the force $F_1$ of the preload spring 74 when the fluid pressure $P_h$ is smaller than a value $F_1/A_3$ so that the piston 70 is at rest.

The passage 136 intervening between the proportioning valve and control valve sections 52b and 132 is in communication with the passage 140 intervening between the control valve and inertia responsive valve sections 132 and 54, when the fluwd pressure $P_g$ in the passage 140 is kept at a relatively low level. In this condition, the fluid pressure $P_h$ is equal to this pressure $P_g$. The fluid pressure $P_g$, however, acts on tye plunger 142 of the control valve section 132 so that the plunger 142 is urged forwardly, viz., away from the chamber 138 against the force $F_3$ of the inner preload spring 146. When, thus, the fluid pressure $P_g$ becomes greater than a level $P_{ho}$ satisfying a condition $P_{ho} \cdot A_4 = F_3$, then the plunger 142 of the control valve section 132 is moved away from the chamber 138 until the annular projection 142c formed at its rear end is forced against the valve plate 148 through the resilient member 144. The fluid communication between the cavity 134 and chamber 138 and accordingly between the passages 136 and 140 is consequently interrupted with the result that the fluid pressure $P_h$ is maintained at a fixed level $P_{ho}$ even though the fluid pressure $P_g$ further increases. The critical fluid pressure $P_{ho}$ causing the plunger 142 to move to this particular position is therefore expressed as $$P_{ho} = F_3/A_4 \qquad \text{Eq. 3-4}$$

The fluid pressure $P_g$ obtaining in the passage 140 acts to urge the plunger 142 and valve plate 148 away from the chamber 138 against the combined forces $F_2 + F_3$ of the preload springs 146 and 152 in the cavity 134. When, thus, the fluid pressure $P_g$ becomes greater than a level $P_{go}$ satisfying a condition written as $$P_{go} \cdot A_5 = F_2 + F_3 + P_{ho}(A_5 - A_4),$$

then the plunger 142 and valve plate 148 are moved away from the chamber 138 against the forces $F_2$ and $F_3$ of the preload springs 146 and 150, respectively, and the force $P_{ho} \times (A_5 - A_4)$, thereby allowing the fluid pressure $P_g$ in the passage 140 into the passage 136 through the chamber 138, the clearance between the apertured valve plate 148 and the reduced portion 142b of the plunger 142. The critical fluid pressure $P_{go}$ causing the plunger 142 and valve plate 148 to such positions is expressed by $$P_{go} = (F_2 + F_3/A_5) + (A_5 - A_4/A_5) \cdot P_{ho} \qquad \text{Eq. 3-5}$$

With the fluid pressure $P_g$ increased beyond this critical level $P_{go}$ thus determined, the plunger 142 and valve plate 148 are maintained in these position on condition that the following equation holds:

$$P_g \cdot A_5 = F_2 + F_3 + (A_5 - A_4)P_h,$$

hence, $$P_h = k_2 \cdot P_g - (F_2 + F_3)/(A_5 - A_4) \qquad \text{Eq. 3-6}$$

where $k_2 = A_5/(A_5 - A_4)$.

Thus, the fluid pressure $P_h$ increases in a manner to satisfy Eq. 3-6 as the fluid pressure $P_g$ increases.

As the fluid pressure $P_g$ still further increases and thus becomes greater than a level $P_{hs}$ satisfying $P_{hs} \cdot A_4 = F_2 + F_3$,
so that
$$P_{hs} = (F_2 + F_3)/A_4, \qquad \text{Eq. 3-7}$$

the plunger 142 and the valve plate 148 are urged toward the front end wall of the cavity 134 against the forces $F_2$ and $F_3$ of the preload springs 146 and 150, respectively. The movement of the valve plate 148 and the plunger 142 is limited by the stop member 154. The fluid communication is then established for a second time between the passage 140 and cavity 134, allowing the fluid pressure $P_g$ into the passage 136. The fluid pressure $P_h$ in the passage 136 is thus equalized with the fluid pressure $P_g$ in the passage 140.

The relationships between the fluid pressures $P_g$ and $P_h$ under the above discussed various condition are tabulated as follows:

$P_g \leq P_{ho}$:  $P_h = P_g$.
$P_{ho} \leq P_g \leq P_{go}$:  $P_h = P_{ho}$.
$P_{go} \leq P_g \leq P_{oo}$:  $P_h = k_2 \cdot P_g - (F_2 + F_3)/(A_5 - A_4)$.
$P_{hs} \leq P_g$:  $P_h = P_g$.

Figure 13:
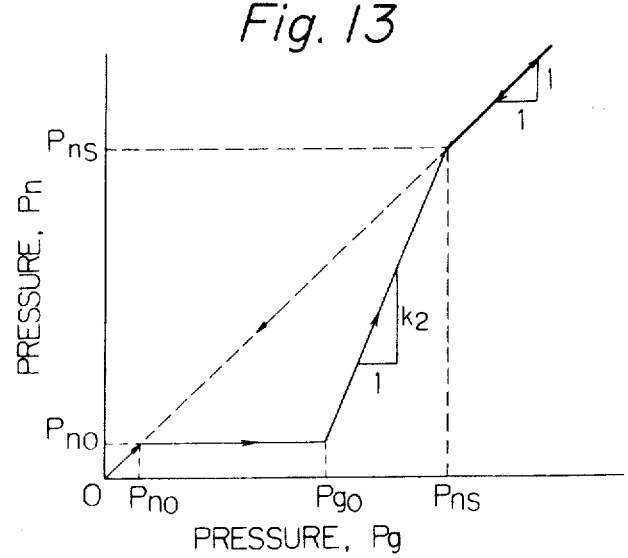
FIG. 13 is a graph showing a relation between fluid pressures $P_g$ and $P_h$ which are hereinafter defined.

These relationships are graphically illustrated in FIG. 13. When, as seen in FIG. 13, the fluid pressure $P_g$ decreases from the level $P_{hs}$, the fluid pressure $P_h$ nearly equals the fluid pressure $P_g$ (because the passage 136 is in communication with the passage 140 with the annular projection 142c of the plunger 142 unseated from the valve plate 148 so that the fluid pressure $P_h$ decreases as indicated by a broken line toward $P_{ho}$.

Figure 14:
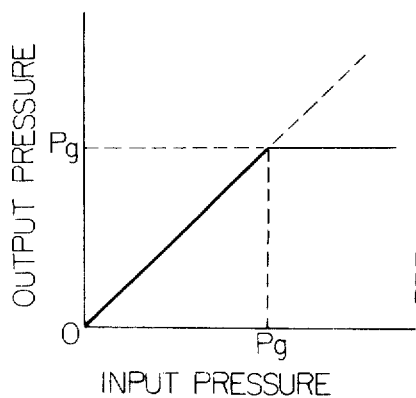
FIG. 14 is a graph showing a relation between the fluid pressures $P_m$ and $P_g$ above mentioned.
Figure 15:
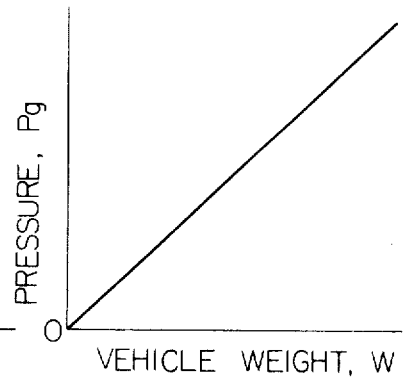
FIG. 15 is a graph showing a relation between the overall vehicle W and a critical fluid pressure $P_{gs}$ which is hereinafter defined.

Since the passage 140 is usually in communication with the fluid inlet port 38 through the cavity 78 so that the fluid pressure in the passage 140 is equal to the input fluid pressure $P_m$. When a deceleration higher than a predetermined rate is developed in the motor vehicle during braking, then the ball member 80 of the inertia-responsive valve section 54 rolls up the incline 78a against the inclination at the angle $\theta$ and abuts against the valve seat member 84, thereby closing the aperture 84a in the valve seat member. The fulid pressure $P_g$ in the passage 140 is consequently maintained at a fixed level. The fluid pressure $P_g$ which has been increasing at the same rate as the fluid pressure $P_m$ as indicated in FIG. 14 no longer rises after the critical level $P_g$ has been reached by the fluid pressure $P_m$ which may continue to further increase. This critical level $P_{os}$ is the pressure obtaining in the passage 140 at the very moment when the aperture 84a in the valve seat member 84 is closed by the ball member, viz., when the input fluid pressure $P_m$ results in a rate of deceleration corresponding to the value $f(\theta)$ which was previously defined in Eq. 1-5 or 2-6. In view of the fact that the braking force B required for decelerating the motor vehicle at the rate of $(G/g)_o$ as previously mentioned increases as the overall weight W of the motor vehicle increases, a relation is obtained which is in correspondence with Eq. 2-7 so that the fluid pressure $P_g$ varies at a constant rate as the vehicle weight varies, as seen in FIG. 15.

Figure 12:
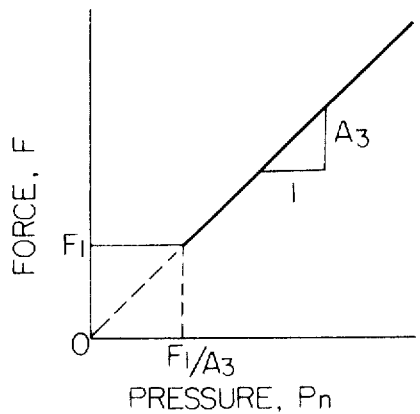
FIG. 12 is a graph showing a relation between a critical fluid pressure $P_h$ and a force $F$ hereinafter defined.

The dimensions of the component parts and elements of the device shown in FIG. 11 should be so selected that the above mentioned critical fluid pressure $P_g$ intervenes between the levels $P_{go}$ and $P_{hs}$ (see FIG. 13), and that the levels $P_{ho}$ and $P_{hs}$ are greater than the value $F_1/A_3$ (see FIG. 12) and the critical fluid pressure $P_g$ is smaller than the critical fluid pressure $P_s$. In this manner, the critical fluid pressure $P_s$ can increase in proportion to the force F as indicated by Eq. 3-1 and this force F, in turn, increases at a rate of $A_3$ as the fluid pressure $P_h$ increases as indicated in FIG. 12. The fluid pressure $P_h$, furthermore, is increased at the rate of $k_2$ larger than 1 as the fluid pressure $P_g$ varies from $P_{go}$ to $P_{hs}$ as indicated in FIG. 13. The critical fluid pressure $P_{hs}$ is increased in proportion to the weight W of the motor vehicle as indicated in FIG. 15 (viz., by Eq. 2-7). It therefore follows that the ratio of the critical fluid pressure $P_s$ versus the vehicle weight W is increased as the vehicle weight W increases.

The relation between the fluid pressure $P_s$ and vehicle weight W is obtained as $$P_s = (A_3/A_2) \cdot \left( \frac{A_5}{A_5 - A_4} \cdot f(\theta) \cdot \frac{W}{C} - \frac{F_2 + F_3}{A_5 - A_4} \right).$$

Eq. 3-8

Figure 16:
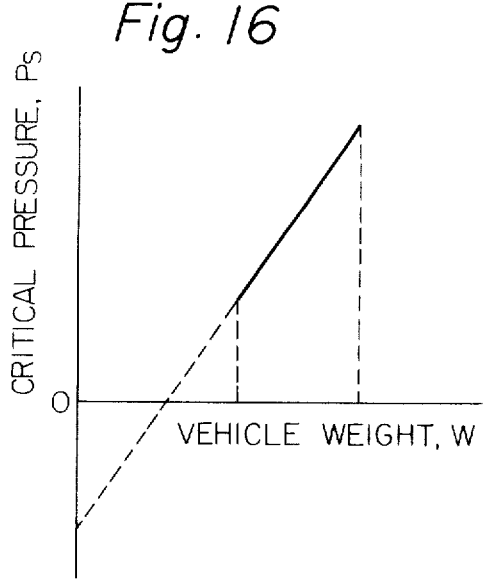
FIG. 16 is a graph showing a relation between the vehicle weight W and a critical fluid pressure $P_s$ hereinafter defined in connection with the device shown in FIG. 11.

As seen in FIG. 16, the plot representative of Eq. 3-9 intersects the axis of ordinate $P_s$ at a point below the point 0 as origin and the fluid pressure $P_s$ per se and the ratio of the fluid pressure $P_s$ versus the vehicle weight W increase concurrently as the vehicle weight increases.

Figure 17:
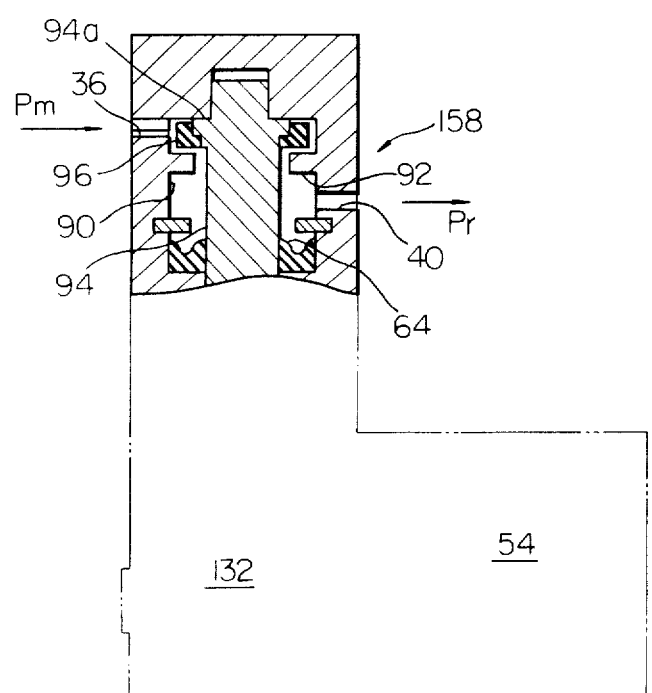
FIG. 17 is a fragmentary longitudinal sectional view showing a modification of the pressure regulating device illustrated in FIG. 11.

FIG. 17 indicates another embodiment in which the pressure regulating device shown in FIG. 11 is modified so as to include a pressure limiting valve section 156 in lieu of the proportioning valve section 52b of the device shown in FIG. 11. This modified regulating device has the pressure limiting valve section 156 constructed similarly to the counterpart of the device shown in FIG. 6. The parts indicated in FIG. 17 are thus designated by the same reference numerals as in FIG. 6 and, as such, the description referring to FIG. 6 applies to the construction and operation of the valve section 156 of the device shown in FIG. 17. The remaining portion of the device shown in FIG. 17 is left blank because it is entirely the same as the counterpart in the device shown in FIG. 11.

It will now be appreciated from the foregoing description the fluid pressure regulating device according to the present invention is useful in that the critical pressure $P_s$ for moving the plunger of the pressure limiting or proportioning valve section is increased at a rate greater than the rate of increase of the overall weight of the motor vehicle. Thus, the desired curves $a_1$, $a_2$ and $a_3$ shown in FIG. 1 can be followed relatively accurately by the relation between the front and rear breaking forces in accordance with the variation in the vehicle weight and, for this reason, the fluid pressure regulating device according to the present invention is adapted to have the fluid pressure distributed to the front and rear wheel cylinders in optimum proportions depending upon the amount of load on the motor vehicle. Since, moreover, the variation in the amount of load on the vehicle is detected through sensing of the rate of deceleration during the braking operation, no such parts and elements are involved in the pressure regulating device as mounted on those portions of the motor vehicle which are displacement caused by the change in the vehicle load. This is advantageous for ease of installation of the regulating device on the vehicle and for the prevention of failures of the regulating device.

It is apparent that the embodiments of the device according to the present invention as herein described and shown are merely by way of example and, therefore, various modifications therefrom may be made within the scope of the present invention which is defined by the following claims.

What is claimed is:

1. A fluid pressure regulating device for a motor vehicle hydraulic braking system incorporating a master cylinder and at least one wheel cylinder, comprising a housing having formed therein first, second and third cavities, said first and second cavities being substantially axially aligned with each other, first and second fluid inlet ports leading from said master cylinder and opened respectively into said first and third cavities and a fluid outlet port leading from said first cavity to said at least one wheel cylinder, a plunger axially movable through said first cavity and extending toward said second cavity, said plunger having an annular projection which is operable to selectively establish and interrupt communication between said first fluid inlet port and said fluid outlet port as said plunger is axially moved, a piston axially slidable in said second cavity and aligned with said plunger a preload spring accommodated in said second cavity and seated on opposed end faces of said plunger and said piston for biasing the plunger to a position establishing said communication between said first inlet port and said fluid outlet port, said second cavity being in communication at its end remote from said first cavity with said third cavity, an inertia-responsive valve member movably positioned on an incline forming part of the wall defining said third cavity, a valve seat member mounted in said third cavity and positioned relative to said inertia-responsive valve member and having an aperture providing said communication between said second and third cavities, said valve member being responsive to a predetermined rate of deceleration for rolling up said incline to close said aperture in said valve seat member and control means for biasing said plunger toward a position blocking said communication between said first fluid inlet port and said fluid outlet port.

2. A fluid pressure regulating device as claimed in claim 1, in which said control means comprises a second preload spring mounted within said second cavity and seated at one end on an end face of said piston and an end wall defining said second cavity for biasing said piston away from said plunger against the action of the first named preload spring.

3. A fluid pressure regulating device as claimed in claim 2, in which the ratio of the preload versus the spring constant of said second preload spring is smaller than that of said first named preload spring.

4. A fluid pressure regulating device as claimed in claim 1, in which said control means comprises a second preload spring which is seated at one end on an outer face of said annular projection of said plunger and at the other on said housing for biasing said plunger toward said second cavity, said second preload spring having a larger amount of preset load than that of the first named preload spring.

5. A fluid pressure regulating device as claimed in claim 4, in which $F_1/(A_3 - A_2)$ is smaller than $Wf(\theta)/C$ wherein $F_1$ is the force of said second preload spring, $A_2$ and $A_3$ are cross sectional areas of a stem portion of said plunger in said first cavity and said piston respectively where $A_3$ is larger than $A_2$, $W$ is an overall weight of the motor vehicle, $C$ is a constant, and $f(\theta)$ is a predetermined value representative of a predetermined rate of deceleration of which said inertia-responsive valve member is caused to roll up said incline having an angle $\theta$ of inclination from a horizontal plane.

6. A fluid pressure regulating device as claimed in claim 4, in which said housing has further formed therein a fourth cavity communicating on one side with said first cavity and on the other side with said first fluid inlet port, and in which said control means further comprising a plunger axially movable through said fourth cavity and having first annular projection having differential working areas and second annular projection operable to selectively establish and interrupt communication between said first cavity and said first fluid inlet port, and a third preload spring biasing said plunger in said fourth cavity toward a position to establish said communication between said first cavity and said first fluid inlet port.

7. A fluid pressure regulating device as claimed in claim 6, in which the ratio of the force of said preload spring in said second cavity versus the force of said third preload spring is smaller than $(A_3 - A_2)/A_4$ where $A_2$, $A_3$ and $A_4$ are cross sectional areas of a stem portion of said plunger in said first cavity, said piston and a stem portion of said plunger in said fourth cavity, respectively, said $A_3$ being larger than said $A_2$.

8. A fluid pressure regulating device as claimed in claim 6, in which $F_3/A_4$ is smaller than $(A_3/A_2) \cdot f(\theta) W/C - F_1/A_2$ wherein $F_1$ and $F_3$ are the forces of said preload spring in said second cavity and said third preload spring respectively, $A_2$, $A_3$ and $A_3$ are cross sectional areas of a stem portion of said plunger in said first cavity, said piston and a stem portion of said plunger in said fourth cavity, $W$ is an overall weight of the motor vehicle, $C$ is a constant and $f(\theta)$ is a value which is representative of a predetermined rate of deceleration at which said inertia-responsive valve member roll up said incline having an angle $\theta$ of inclination from a horizontal plane.

9. A fluid pressure regulating device as claimed in claim 8, in which $f(\theta) \cdot W/C$ is smaller than said $(A_3/A_2) \cdot f(\theta) \cdot W/C - F_1/A_2$.

10. A fluid pressure regulating device as claimed in claim 1, in which said housing has further formed therein a fourth cavity in communication with said second and third cavities, and in which said control means comprises a plunger axially slidable in said fourth cavity having a first annular projection having differential working areas, a second annular projection spaced from said first annular projection and a reduced portion extending between said first and second annular projections, a valve plate having an aperture through which said reduced portion of the plunger extend at a spacing therefrom, said valve plate being engageable with said second annular projection of the plunger and with a wall portion defining said fourth cavity for blocking communication between said second and third cavities, a second preload spring biasing said plunger in said fourth cavity toward a position in which said second annular projection is moved away from said valve plate, and a third preload spring biasing said valve plate to a position engaging with said wall portion of the fourth cavity.

11. A fluid pressure regulating device as claimed in claim 10, in which $f(\theta) \cdot W/C$ is larger than $(F_2+F_3)/A_5 + (A_5 - A_4) \cdot F_3/A_5 \cdot A_4$ and smaller than $(F_2+F_3)/A_4$ wherein $f(\theta)$ is a value representative of a predetermined rate of deceleration at which said inertia-responsive valve member is caused to roll up said incline having an angle $\theta$ of inclination from a horizontal plane, $W$ is an overall weight of the motor vehicle, $C$ is a constant, $F_2$ and $F_3$ are the forces of said second and third preload springs respectively, and $A_4$ and $A_5$ are respectively the cross sectional area of a stem portion of said plunger in said fourth cavity and the cross sectional area with which said valve plate is subjected to a fluid pressure from said third cavity.

12. A fluid pressure regulating device as claimed in claim 11, in which a value in a range between $F_3/A_3$ and $(F_2+F_3)/A_3$ is larger than $F_1/A_3$ wherein $F_1$ is the force force of said preload spring in said second cavity and $A_3$ is a cross sectional area of said piston.

13. A fluid pressure regulating device as claimed in claim 1, in which said inertia-responsive valve member is a ball having a predetermined amount of weight.

* * * * *